(12) United States Patent
Rokui

(10) Patent No.: US 8,675,653 B2
(45) Date of Patent: Mar. 18, 2014

(54) CO-EXISTING STATIC AND DYNAMIC IP MULTICAST

(75) Inventor: Reza Mohammad Rokui, Kanata (CA)

(73) Assignee: Alcatel Lucent, Paris (FR)

( * ) Notice: Subject to any disclaimer, the term of this patent is extended or adjusted under 35 U.S.C. 154(b) by 1831 days.

(21) Appl. No.: 11/130,171

(22) Filed: May 17, 2005

(65) Prior Publication Data

US 2006/0262792 A1 Nov. 23, 2006

(51) Int. Cl.
*H04L 12/28* (2006.01)
*H04L 12/56* (2011.01)
*H04N 7/173* (2011.01)

(52) U.S. Cl.
USPC .............. 370/390; 370/408; 725/87; 725/98; 725/105

(58) Field of Classification Search
USPC ........................................................ 370/390
See application file for complete search history.

(56) References Cited

U.S. PATENT DOCUMENTS

| | | | | |
|---|---|---|---|---|
| 6,151,696 A * | 11/2000 | Miller et al. | ................... | 714/748 |
| 6,331,983 B1 * | 12/2001 | Haggerty et al. | .............. | 370/400 |
| 6,721,318 B1 * | 4/2004 | Cai et al. | ........................ | 370/390 |
| 6,785,294 B1 * | 8/2004 | Ammitzbøll et al. | .......... | 370/467 |
| 7,107,606 B2 * | 9/2006 | Lee | ................................... | 725/87 |
| 7,301,914 B2 * | 11/2007 | Segal et al. | .................... | 370/311 |
| 2004/0071098 A1 * | 4/2004 | Magnuski | ...................... | 370/260 |
| 2004/0132448 A1 * | 7/2004 | Torres et al. | .................. | 455/427 |
| 2006/0015928 A1 * | 1/2006 | Setty et al. | ..................... | 725/148 |
| 2006/0164984 A1 * | 7/2006 | Rao et al. | ....................... | 370/230 |
| 2006/0274720 A1 * | 12/2006 | Adams et al. | .................. | 370/351 |

OTHER PUBLICATIONS

Reynolds, J. and Postel, J., RFC-1700 Assigned numbers, Network Working Group, Oct. 1994, pp. 56-69.*
Droms, R., RFC-2131 Dynamic Host Configuration Protocol, Mar. 1997, pp. 1-10.*
Adams et al., U.S. Appl. No. 60/626,816, p. 17, Nov. 9, 2004.*
Cain, B. et al., RFC-3376 Internet Group Management Protocol Version 3, Network Working Group, Oct. 2002, pp. 1-8.*
David Meyer et al: "Source-Specific Protocol Independent Multicast in 232/8 (draft-ietf-mboned-ssm232-08.txt)" Internet Draft, Mar. 2004, XP015022800.
Manolo Sola et al: "Modifications to PIM-SM for Static Multicast (draft-sola-pim-static-multicast-00.txt)" Internet Draft, Aug. 1998, XP015035542.
Otha Tokyo et al: Static Multicast (draft-otha-static-multicast-02.txt) Internet Draft, Jun. 1999, XP015033427.

(Continued)

*Primary Examiner* — Faruk Hamza
*Assistant Examiner* — Cassandra Decker
(74) *Attorney, Agent, or Firm* — Kramer & Amado, P.C.

(57) ABSTRACT

A system and method are provided for providing both static and dynamic IP multicasting. When a router receives a PIM message or an IGMP message, the router determines whether the group specified in the message is within the multicast Static-Range. If the group pertains to a static multicasting group, the router does not propagate the message to upstream routers and only connects or disconnects interfaces internal to the router. If the multicast group address in the message is not within the multicast Static-Range, the router implements PIM or IGMP protocols. If the invention is used for broadcasting TV, the low end of TB channels or commonly used channels can be created as static IP multicast. This way, a user can access or leave such channels without an entire shortest path tree being created or torn down, improving access time and channel surfing for a user.

4 Claims, 5 Drawing Sheets

(56) References Cited

OTHER PUBLICATIONS

Cain B et al: "Internet Group Management Protocol, Version 3" Request for Comments 3376, Oct. 2002, XP015009135.

Estrin D et al: "Protocol Independent Multicast-Sparse Mode (PIM-SM): Protocol Specification" Request for Comments 2362, Jun. 1998, XP015008146.

* cited by examiner

CO-EXISTING STATIC AND DYNAMIC IP MULTICAST

FIELD OF THE INVENTION

The invention relates to IP multicasting in communication networks, and more particularly to IP address ranges for use in creation of IP multicast distribution trees.

BACKGROUND OF THE INVENTION

To establish a multicast tree from a source which provides multicast content to several hosts which desire to receive the traffic, two general approaches are Dynamic IP Multicast and Static IP Multicast. In dynamic multicast, a multicast protocol such as Protocol Independent Multicast-Sparse Mode (PIM-SM) or Protocol Independent Multicast-Source Specific Mode (PIM-SMM) is used to create and propagate the multicast tree from multicast hosts to a multicast source. In static multicast, the multicast protocol is not responsible for establishing and propagating the multicast tree. Rather, establishment of the multicast tree is effected by other means such as network management or through configuration.

In PIM-SM, a shortest path tree (SPT) can not be established directly between the source and hosts because the hosts are unaware of the identification of the source. The hosts can only identify the content as belonging to a multicast group. Rendezvous Points (RPs) are routers used as temporary waypoints in order to assist in creation of the SPT. AU routers have access to an identical mapping between multicast groups and RPs, one RP being associated with each group. When a router receives an IGMP-JOIN(*,G) or a PIM-JOIN(*,G) message, the router establishes a route towards the RP associated with the group. As numerous routers establish routes to the RP, an RP tree (RPT) is established. The router connected to the source (the source router) has the same mapping between RPs and groups. When the source begins transmitting IP packets for a group, the source router starts registration of the packets with the RP by encapsulating the IP packets and forwarding them to the RP. As the routers within the RPT connected to the hosts receive the IP packets via the RPT, they learn the identification of the source, create SPT routes to the source, and tear down the routes to the RP. The RTP is thereby converted into a SPT.

In PIM-SMM, the hosts are aware of the source of the multicast content for a given group. In an example of PIM-SMM being used for broadcasting TB channels, when a user selects a channel to watch, a set top box (STB) determines the multicast group G and a source S for the channel and sends an IGMP JOIN(S,G) message to a host router. The multicast group is defined by a Class D IP address within the range 224/4. The host router first establishes internal connections between an outgoing interface (OIF) to the STB and an incoming interface (IIF) to the next router. The host router then determines the next router through which the source can be reached, and forwards a PIM JOIN(S,G) message to the next upstream router. The next router creates its own internal connections and forwards the PIM JOIN(S,G) message to an upstream router towards the source S. This is repeated until a PIM JOIN(S,G) message reaches either the router attached to the source or reaches a router which already has (S,G) state.

If any router receives a PIM JOIN(S,G) message and the multicast distribution tree is already supported for (S,G) at the router because a PIM JOIN(S,G) or an IGMP JOIN(S,G) for the same source and group have already been received from a different router or another host, then the router simply establishes the internal connection between the OIF through which the newly arrived PIM JOIN(S,G) message arrived and the IIF which leads to the source.

In PIM-SM, if a host no longer wishes access to the group, the host sends an IGMP LEAVE(*,G) message to the host router. The host router first removes the connection between the OIF of the host and the IIF leading to the RP. If no other hosts are currently willing to receive traffic for the same group, then the host router then sends a PIM PRUNE(*,G) message to the upstream router towards the RP. This is repeated by the upstream routers until either the RP or a router supporting more than one host for the group is reached, at which point the internal connection to the OIF is removed and the PIM PRUNE(*,G) message is not forwarded.

In PIM-SMM, if a host no longer wishes access to the group, the host sends an IGMP LEAVE(S,G) message to the host router. The host router first removes the connection between the OIF of the host and the IIF leading to the next upstream router. If no other hosts are currently willing to receive traffic for the same group and from the same source then the host router then sends a PIM PRUNE(S,G) message to the upstream router. This is repeated by the upstream routers until either the source router or a router supporting more than one host for the group and source is reached, at which point the internal connection to the OIF is removed and the PIM PRUNE(S,G) message is not forwarded.

In both flavors of PIM protocol, a shortest path tree between multiple hosts and a source is eventually generated and maintained as hosts request access to or leave the group and the source. Dynamic multicast results in efficient use of interfaces, since each IIF in each router is generally shared by each downstream host, and each OIF in each router is generally shared by each downstream host of a downstream router. However, in applications in which hosts leave and join groups frequently, users may experience undesirable delay as RPTs and SPTs are established, torn down, or altered. An example of such an application is TV broadcasting.

In TV broadcasting applications of IP multicasting, users may frequently switch the channel being watched as they scan channels for content or switch between channels during commercials. When a user switches between a first channel and a second channel, the STB first sends an IGMP LEAVE($S_1,G_1$) message to the host router which may then send a PIM PRUNE($S_1,G_1$) message upstream. The STB then sends an IGMP JOIN($S_2,G_2$) message to the host router which may then send a PIM JOIN($S_2,G_2$) message upstream. Each time a user switches channels, a portion of the shortest path tree is torn down and a new shortest path tree or portion of a shortest path tree is created. This consumes processing power at the routers, and more importantly (for the customer) can result in unacceptable delay in channel surfing because the PIM-SMM messages are transmitted around the network to tear down the old multicast tree and rebuild a new one.

Static multicasting provides a solution to this problem. The multicast distribution tree is established once for each multicast group (or channel) from end-user hosts to multicast source without using any multicast protocol. To setup a static multicast tree from a host for group G to a multicast source S, the multicast connections should be created on each router from the host router to the multicast source, similar to the PIM-SMM protocol. However, static multicast lacks the flexibility offered by dynamic multicast in automatic creation and maintenance of SPT trees as groups are added. Static multicast also requires that OIFs and IIFs be reserved for SPT trees, even if there are no hosts currently receiving multicast content over the SPT tree.

A system which allowed the coexistence of static multicast and dynamic multicast without conflict would allow the advantages of each multicast method to be realized. Such a system must allow PIM-SM and PIM-SSM protocols to run in a network in which static multicast states are provisioned, without resulting in tearing down or corruption of the static multicast SPTs. Such a system should allow addition or removal of dynamic multicast states and static multicast states independently of each other. In this way, more commonly used groups may be established using static multicast and paths of less commonly used groups may be accessed only as needed using the dynamic multicast. This would provide less delay to users as they switch between commonly used groups while maintaining efficient use of router resources.

SUMMARY OF THE INVENTION

In accordance with one aspect of the invention, a method is provided for implementing IP multicasting in a communication network. A multicast Static-Range is defined, being a set of at least one Class D IP address. Each IP address within the multicast Static-Range is reserved for static IP multicasting. At least one dynamic IP multicasting group is established in the network, each such dynamic IP multicasting group having a respective IP address lying outside the multicast Static-Range. At least one static IP multicasting group is established in the network, each such static IP multicasting group having a respective IP address lying within the multicast Static-Range, and PIM-SMM messaging and PIM-SM messaging is ignored for such groups.

In accordance with another aspect of the invention, a method is provided for supporting coexistence of static IP multicasting and dynamic IP multicasting at a router in a communication network. A multicast Static-Range is stored in memory, the multicast Static-Range being a set of at least one Class D IP address reserved for static IP multicasting. Upon receipt of a PIM message or an IGMP message, it is determined whether the message pertains to a static multicasting group. If the message does not pertain to a static multicasting group, the message is processed in accordance with dynamic IP multicast. If the message does pertain to a static multicasting group and the message is a PIM message, the message is discarded. If the message pertains to a static multicasting group and the message is an IGMP JOIN message specifying a source, a connection identifiable by the source and the group is established within the router without forwarding a PIM message to an upstream router. If the message pertains to a static multicasting group and the message is an IGMP LEAVE message specifying a source, a connection within the router and identifiable by the source and the group is removed, without forwarding a PIM message to an upstream router.

In accordance with another aspect of the invention, a router is provided for use in a communication network. The router includes a memory for storing a multicast Static-Range, the multicast Static-Range being a set of at least one Class D IP address, each IP address within the multicast Static-Range being reserved for static multicasting. The router includes means for determining, upon receipt of a message, whether the message pertains to a static multicast group. The router includes means for ignoring a received PIM message in the event that the message pertains to a static multicast group. The router includes means for processing a received PIM message in accordance with PIM protocol in the event that the message does not pertain to a static multicast group. The router includes means for, upon receipt of an IGMP message, determining whether the message pertains to a static multicast group. The router includes means for, upon receipt of an IGMP JOIN message specifying a source, establishing a connection within the router without forwarding a corresponding PIM message to an upstream router in the event that the IGMP JOIN message pertains to a static multicast group. The router includes means for, upon receipt of an IGMP LEAVE message specifying a source, removing a connection within the router without forwarding a corresponding PIM message to an upstream router in the event that the IGMP LEAVE message pertains to a static multicast group. The router includes means for processing a received IGMP message in accordance with dynamic IP multicast in the event that the message does not pertain to a static multicast group.

The methods of the invention may be stored on computer-readable media as instructions executable by a processor.

The methods and apparatus of the present invention allow both dynamic and static IP multicast to coexist and allow the states created by both multicast methods to be maintained independently. By providing a range of Class D IP addresses which is defined and reserved for static IP multicast, network routers can distinguish static multicast groups from dynamic multicast groups and can apply a new rule set to PIM JOIN/PRUNE and IGMP JOIN/LEAVE messages. Static channels can thereby be added or removed at the routers without triggering any dynamic multicast. The methods and the apparatus of the invention may find particular use in TV broadcasting, where commonly accessed TV channels may be configured using static multicast while less commonly accessed TV channels or specialty channels (such as pay-per-view channels) may be configured using dynamic multicast.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
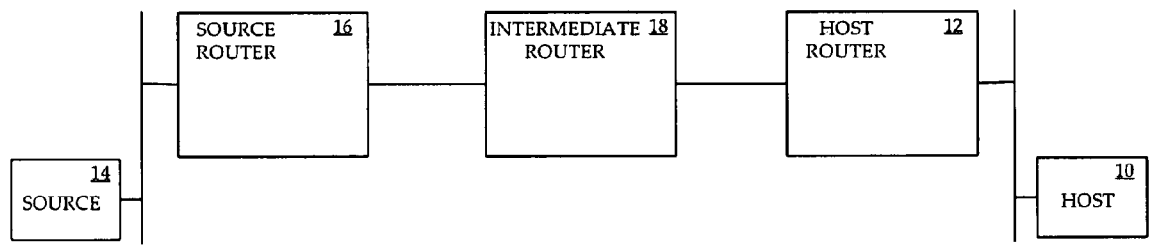
FIG. 1 is a block diagram of a portion of an example communication network.

Referring to FIG. 1, a block diagram of a portion of an example communication network is shown. A host 10, operated by a user, is connected to the network through a host router 12. The host 10 may be any device capable of requesting and receiving IP multicast traffic, such as a set top box (STB). A multicast source 14 is connected to the network through a source router 16, and offers IP multicast content for multicast group $G_1$. The host router 12 and the source router 16 communicate through an intermediate router 18. The layout of FIG. 1 is for example purposes only, and more generally there may be a plurality of hosts, a plurality of host routers, a plurality of sources, a plurality of source routers, and a plurality of intermediate routers between host routers and source routers. The source typically offers content in more than one multicast group.

Figure 2:
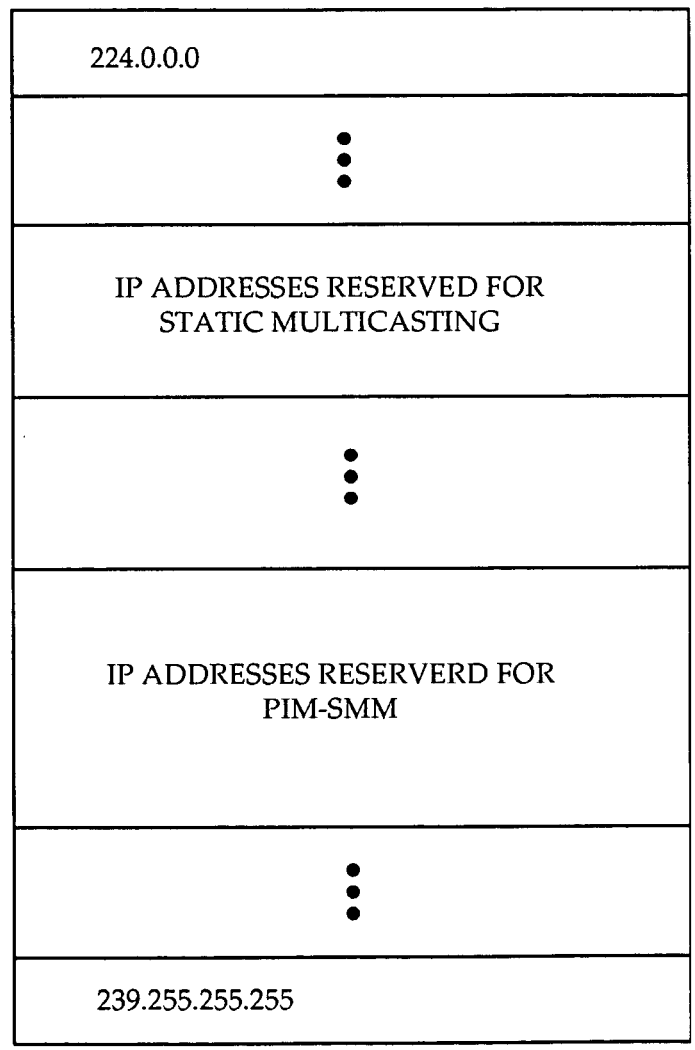
FIG. 2 is a diagram of Class D IP address allocation according to one embodiment of the invention.

Referring to FIG. 2, a diagram of Class D IP addresses is shown. Class D IP addresses are reserved for IP multicasting, and include IP addresses from 224.0.0.0 to 239.255.255.255. A range of IP addresses within Class D is already reserved for PIM-SSM, from 232.0.0.0 to 238.255.255.255 (238/8). This range is known as SSM-Range, and is defined by IETF (Meyer et al., "Source-Specific Protocol Independent Multicast in 232/8", IETF Draft, March 2004). According to one embodiment of the invention a range of IP addresses, referred to herein as the multicast Static-Range, within Class D is reserved for static multicasting. Although shown in FIG. 2 as lying below the range of PIM-SSM addresses, the range of static multicasting IP addresses may be a set of any Class D IP addresses which do not overlap the SSM-Range.

Broadly, in operation any router which receives an IGMP or a PIM message determines the group G defined within the message. If the group G lies within the multicast Static-Range, the router does not use the PIM protocol. Otherwise, the router uses the PIM protocol. In this way, IP multicasting groups can be defined as static by assigning them an IP address lying within the Static-Range. When a host joins a static IP multicasting group by sending an IGMP JOIN(S,G) message, the host router builds an internal connection between OIF and IIF but does not propagate any PIM-JOIN (S,G) message to upstream routers. When a host leaves a static multicasting group by sending an IGMP LEAVE(S,G) message, the host router tears down the internal connections between OIF and IIF but does not propagate any PIM-PRUNE(S,G) message to upstream routers. If a host joins or leaves a dynamic multicasting group, that is, a group whose IP address does not lie within the multicast Static-Range, the routers employ either the PIM-SM or PIM-SSM protocol to build and tear down shortest path trees or the RP trees, or to register a multicast source with an RP in the case of PIM-SM.

Figure 3:
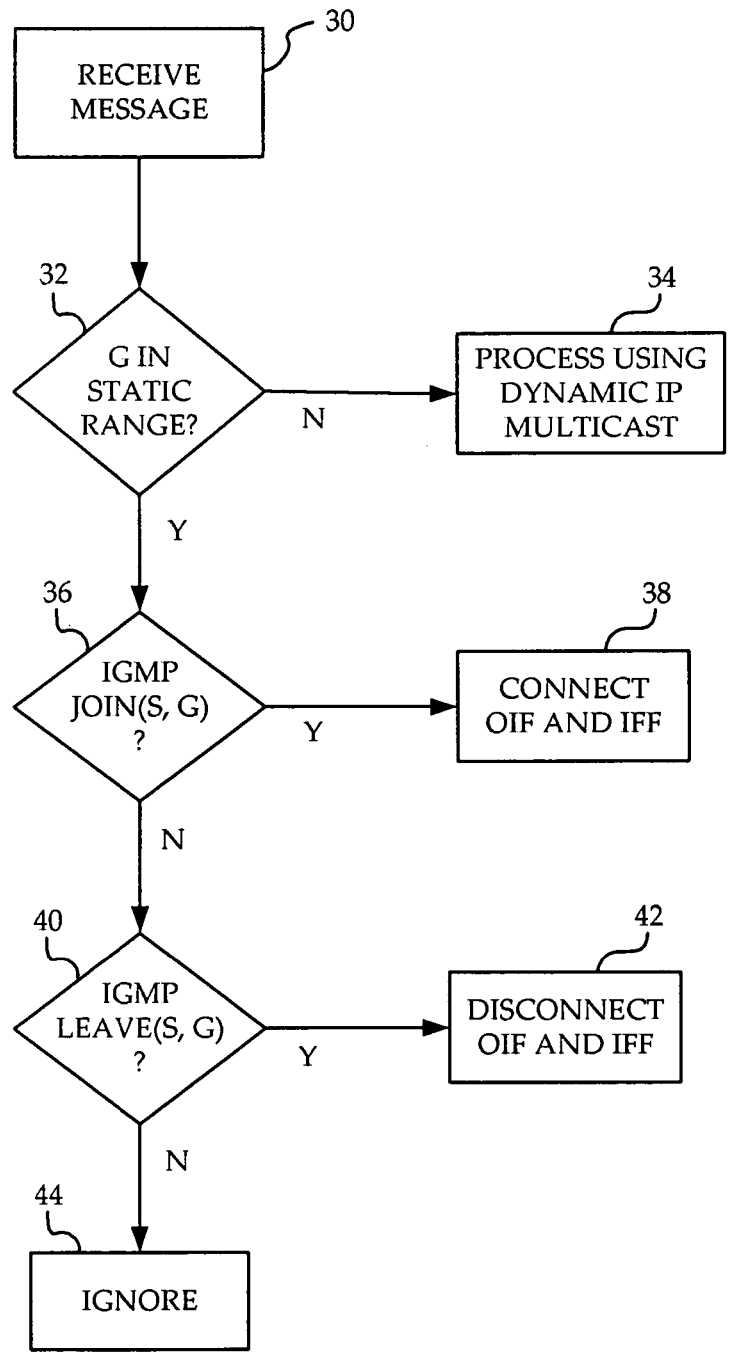
FIG. 3 is a flowchart of a router of FIG. 1 processes PIM and IGMP messages according to one embodiment of the invention.

Referring to FIG. 3, a flowchart of a method implemented by a router in a communication network according to one embodiment of the invention is shown. At step 30 the router receives either a PIM message or an IGMP message. The multicast Static-Range is configured in memory within the router. The router determines the group G in the message, and at step 32 the router determines whether the group G lies within the multicast Static-Range. If the group G does not lie within the multicast Static-Range, the router processes the message using conventional dynamic IP multicast.

If the group G does lie within the multicast Static-Range, the router determines at step 36 whether the message is an IGMP JOIN(S,G) message. If the message is an IGMP JOIN (S,G) message, then at step 38 the router establishes a connection between the downstream outgoing interface (OIF) through which the message arrived and the upstream incoming interface (IIF) leading to the source S specified by the message.

If the message is not an IGMP JOIN(S,G) message, then at step 40 the router determines whether the message is an IGMP LEAVE(S,G) message. If the message is an IGMP LEAVE(S,G) message, then at step 42 the router removes the connection between the OIF through which the message arrived and the IIF leading to the source S specified by the message.

If the message is not an IGMP LEAVE(S,G) message, then at step 42 the router ignores the message. Any such message will be either a PIM JOIN(S,G) message, a PIM JOIN(*,G) message, a PIM PRUNE(S,G) message, a PIM PRUNE(*,G) message, a PIM REGISTER message, an IGMP JOIN(*, G) message, or an IGMP LEAVE(*, G) message, none of which are to be processed for group addresses which lie within the multicast Static-Range.

Figure 4:
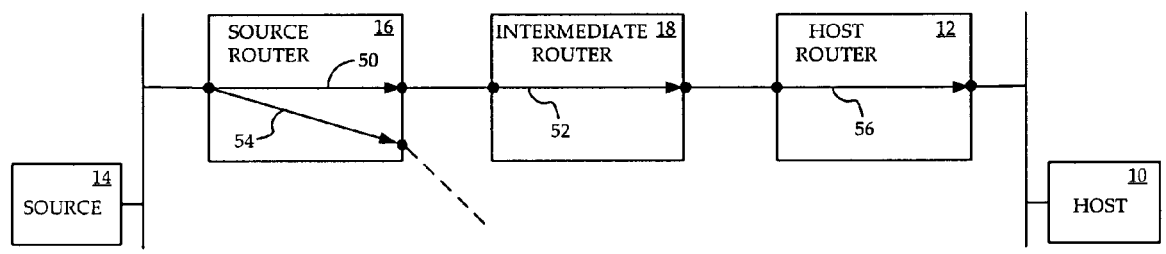
FIG. 4 is a block diagram of the network of FIG. 1 in which an example static IP multicasting group is configured according to one embodiment of the invention.

Referring to FIG. 4, the example communication network of FIG. 1 is shown following establishment of a Static IP Multicast connection according to one embodiment of the invention. The source 14 offers IP multicasting for a group $G_1$ appropriate for Static Multicasting, such as a television channel which will requested and dropped frequently by users. The group $G_1$ is a multicast IP address lying within the multicast Static-Range and is configured on each router. Since there is no dynamic protocol running in the network for this group (since it lies within the multicast Static-Range), the connection between the downstream OIFs and the upstream IIFs leading to the source at each router (except the host router 12) must be established by configuration or by an automated method. To establish the multicast tree at the source router 16, the source router 16 is provided, either manually or by an automated method, with an IGMP JOIN(S,$G_1$) message at an OIF leading to the downstream intermediate router 18. As described above with reference to step 38 of FIG. 3, the source router 16 establishes a connection 50 between the IIF leading to the source 14 and the OIF leading to the intermediate router. Similarly, the intermediate router 18 is provided with an IGMP JOIN(S,$G_1$) message at an OIF leading to the downstream host router 12, which causes the intermediate router 18 to establish a connection 52 between the OIF leading to the host router and the IIF leading to the source 14. The intermediate router 18 does not propagate a PIM JOIN(S,$G_1$) message to the upstream source router 16, as the intermediate router recognizes that the IP address of the Group $G_1$ lies within the multicast Static-Range.

Other OIFs at the source router 16 and the intermediate router 18 may similarly be provided with IGMP JOIN(S,$G_1$) messages, if these OIFs lead towards other routers that may be interested in receiving traffic for the group $G_1$. For example, a connection 54 may be established between the same IIF as connection 52 and an OIF leading to a second host router (not shown in FIG. 4).

When the host 10 wishes to receive multicast traffic for the group $G_1$, the host sends an IGMP JOIN(S,$G_1$) message to an OIF of the host router 12, and the host router 12 establishes a connection 56 between the OIF leading to the host and an IIF leading to the source. The host router 12 recognizes that the IP address of the group $G_1$ lies within the multicast Static-Range and, contrary to normal PIM-SMM behavior, does not then send a PIM JOIN(S,$G_1$) message to the upstream intermediate router 18. This is because the multicast connections on all upstream routers towards the source 14 have already been established separately ahead of time for group $G_1$. Because most of the path leading to the source 14 already exists, the host 10 has access to the group $G_1$ much more quickly than if Dynamic IP Multicasting was being used and some or all of the shortest path tree had to be established.

Similarly, as described above with reference to FIG. 3, if the host 10 leaves the channel, such as by switching to another channel, the host router 12 removes the connection 56 but does not send a PIM PRUNE(S,$G_1$) message to the intermediate router 18.

If the host 10 wishes to join a different multicast tree defined for a group $G_2$, the host 10 sends an IGMP(S, $G_2$) message to the host router 12. If the group $G_2$ does not lie within the configured Static-Range (as described above with reference to step 32 of FIG. 3), the host router 12 processes the IGMP JOIN(S,$G_2$) message as a dynamic IP multicast. As a result, the PIM-SSM protocol establishes a connection between the OIF over which the IGMP JOIN(S,$G_2$) message was received and an IIF leading towards the specified source S, and then sends a PIM-JOIN(S,$G_2$) to the appropriate upstream router. The upstream routers establish internal connections and propagate PIM-JOIN(S,$G_2$) messages upstream, in accordance with usual PIM-SSM behavior, since the IP address of group $G_2$ is not within the multicast Static-Range.

Similarly, if the host 10 wishes to join a multicast tree (*,$G_3$), the host sends an IGMP JOIN(*,$G_3$) message to the host router 12. Being a sparse mode multicast, the group $G_3$ should not lie within the Static-Range. The host router 12 determines that the IP address of the group $G_3$ does not lie within the multicast Static-Range (as described above with reference to step 32 of FIG. 3), and processes the IGMP JOIN(*,$G_3$) message as a dynamic IP multicast. Internal router connections are established and PIM-JOIN(*,$G_3$) messages are propagated upstream towards the RP in accordance with usual PIM-SM behavior.

Figure 5:
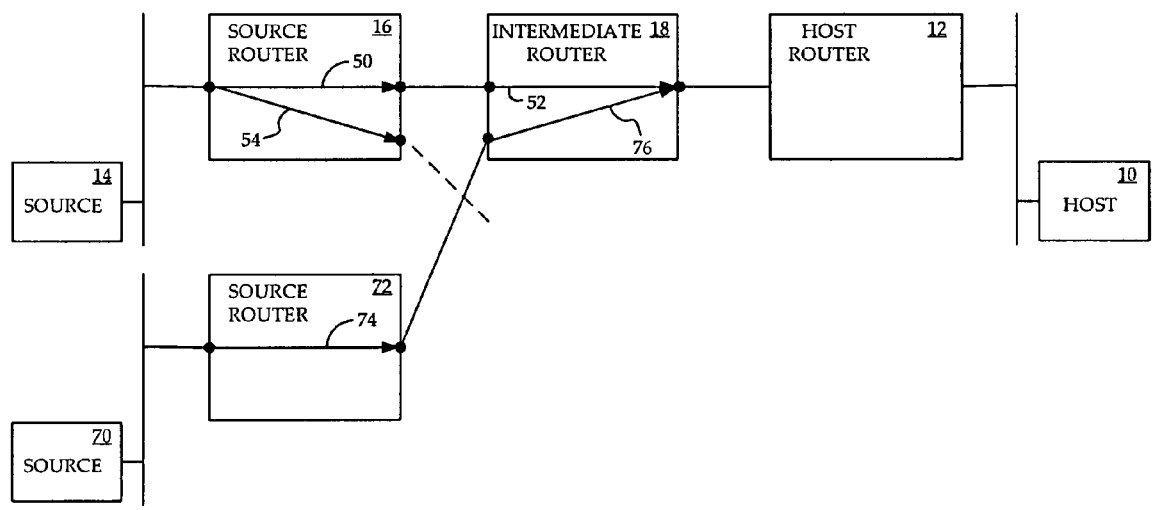
FIG. 5 is a block diagram of the network of FIG. 1 in which a second example static IP multicasting group is configured according to one embodiment of the invention.

The invention provides flexibility in configuring additional static multicasting trees or removing existing multicast trees. In other words, a static multicast tree can be added or removed without interrupting either static or dynamic networks. Referring to FIG. 5, the example communication network of FIG. 4 is shown following establishment of a second static multicasting tree according to one embodiment of the invention. Group $G_1$ remains configured in the form of connections 50, 52, and 54 between respective OIFs and IIFs. A second group $G_4$, having an IP address lying within the multicast Static-Range, is offered by a second source 70 $S_2$ is configured similarly as is described above for configuration of group $G_1$ with reference to FIG. 4. An IGMP-JOIN($S_2$, $G_4$) message is provided to an OIF on a second source router 72 which leads to the intermediate router 18. The second source router 72 determines that the IP address of the group $G_4$ lies within the multicast Static-Range, and establishes a connection between the OIF and the IIF leading to the second source. An IGMP-JOIN($S_2$,$G_4$) message is provided to the OIF on the intermediate router which leads towards the host router 12, and in response thereto the intermediate router 18 establishes a connection between the OIF and an IIF leading towards the source router 72. It can be seen that in establishing the internal connections, the existing static multicasting group $G_1$ (originating at source 14) and any dynamic multicasting groups currently in effect are not affected by configuration of the second static multicasting group $G_4$.

The method by which the routers process the PIM control messages, described above with reference to FIG. 3, is preferably carried out in the form of software instructions within one or more processors, but may more generally be stored and accessed as instructions in the form of any combination of software and hardware, including hardware within an integrated circuit. If in the form of software instructions, the software instructions may be stored on a computer-readable medium.

The invention has been described with reference to a range of Class D IP addresses reserved for use in static IP multicasting, referred to as the multicast Static-Range. Alternatively, the IP addresses reserved for static IP multicasting need not be contiguous. The invention can be easily understood to be more generally operational with a multicast Static-Range defined as a set of IP addresses reserved for use in static IP multicasting being not necessarily contiguous. However, using a set of IP addresses defined as a contiguous range simplifies implementation of the invention as it is easier to determine whether the IP address of a multicast group identified in a PIM or IGMP message is within a contiguous set specified by upper and lower values.

The embodiments presented are exemplary only and persons skilled in the art would appreciate that variations to the embodiments described above may be made without departing from the spirit of the invention. Methods that are logically equivalent or similar to the method described above with reference to FIG. 3 may be used to implement the methods of the invention. The scope of the invention is solely defined by the appended claims.

I claim:

1. A method of implementing Internet Protocol (IP) Multicasting in a communication network, the method comprising:
    defining a multicast Static-Range, being a set of Class D IP addresses that do not use a Protocol Independent Multicast (PIM) protocol and do not overlap with an existing Source Specific Multicast (SSM) IP address range;
    reserving each IP address within the multicast Static-Range for static IP multicasting;
    establishing, in the communication network, at least one dynamic IP multicasting group, the at least one dynamic multicasting group having a respective IP address lying outside the multicast Static-Range;
    establishing, in the communication network, at least one static multicasting group for which both PIM-Source Specific Mode (PIM-SSM) messaging and PIM-Sparse Mode (PIM-SM) messaging are ignored, the at least one static multicasting group having a respective IP address lying within the multicast Static-Range;
    establishing static multicast connections for all upstream routers from a host router toward a source, wherein dynamic multicast states and static multicast states are both added and removed independently;
    after all upstream connections are established, upon receipt of an IGMP message from a host at the host router, determining whether the multicast group address therein is within the multicast Static-Range;
    if the multicast group address is within the multicast Static-Range and the IGMP message is an IGMP JOIN message, building a connection between a downstream outgoing interface (OIF) leading to the host and an upstream ingoing interface (IIF) leading to the source without forwarding a PIM message; and
    if the multicast group address is within the multicast Static-Range and the IGMP message is an IGMP LEAVE message, tearing down the connection between the OIF and IIF without forwarding a PIM message.

2. The method of claim 1, wherein establishing the static multicast connections for all upstream routers does not involve use of a PIM JOIN message.

3. A method of supporting coexistence of static IP multicasting and dynamic IP multicasting at a host router in a communication network, comprising:
    storing a multicast Static-Range in memory, the multicast Static-Range being a set of at least one Class D IP address reserved for static IP multicasting, excluding the existing Source Specific Multicast (SSM) IP address range;
    upon receipt of a Protocol Independent Multicast (PIM) message or an Internet Group Management Protocol (IGMP) message, determining whether the multicast group address in the message falls within the multicast Static-Range;
    when the multicast group address in the message does not fall within the multicast Static-Range, processing the message in accordance with dynamic IP multicast;

when the multicast group address in the message falls within the multicast Static-Range and the message is a PIM message, discarding the message;

when the multicast group address in the message falls within the multicast Static-Range and the message is an IGMP JOIN message specifying a source, after static and multicast connections for all upstream routers from the host router have been established, establishing a connection within the host router between a downstream outgoing interface (OIF) leading to the host from which the IGMP JOIN message was received and an upstream ingoing interface (IIF) leading to the source without forwarding a PIM message, wherein dynamic multicast states and static multicast states are both added and removed independently; and when the multicast group address in the message falls within the multicast Static-Range and the message is an IGMP LEAVE message specifying a source, removing a connection within the host router between the OIF and IIF without forwarding a PIM message.

4. A communication network, comprising:

at least one multicast source that offers IP multicast content;

at least one source router that connects the at least one multicast source to the communication network;

a host that requests and receives IP multicast traffic;

a host router that connects the host to the communication network; and an intermediate router that connects the at least one source router to the host router, wherein:

upon receipt of a Protocol Independent Multicast (PIM) or an Internet Group Management Protocol (IGMP) message, the host router determines whether the multicast group address in the received message falls within a multicast Static-Range being at least one Class D IP address reserved for static IP multicasting, excluding the existing Source Specific Multicast (SSM) IP address range, when the multicast group address in the message falls within the multicast Static-Range and the message is a PIM message, discarding the message;

when the multicast group address in the message falls within the multicast Static-Range and the message is an IGMP JOIN message specifying a source from the host, after static multicast connections for all upstream routers from the host router have been established, the host router establishes a connection between a downstream outgoing interface (OIF) leading to the host and an upstream ingoing interface (IIF) leading to the source without forwarding a PIM message, wherein dynamic multicast states and static multicast states are both added and removed independently, and when the multicast group address in the message falls within the multicast Static-Range and the message is an IGMP LEAVE message specifying a source, removing a connection between the OIF and IIF without forwarding a PIM message.

* * * * *